United States Patent
Tanabe et al.

(10) Patent No.: US 6,852,773 B2
(45) Date of Patent: Feb. 8, 2005

(54) PHOTOCURABLE RESIN COMPOSITION AND OPTICAL PARTS

(75) Inventors: Takayoshi Tanabe, Ibaraki (JP); Jiro Ueda, Ibaraki (JP); Tetsuya Yamamura, Ibaraki (JP); Takashi Ukachi, Ushiku (JP)

(73) Assignee: DSM IP Assets B.V., Heerlen (NL)

( * ) Notice: Subject to any disclaimer, the term of this patent is extended or adjusted under 35 U.S.C. 154(b) by 83 days.

(21) Appl. No.: 10/193,683

(22) Filed: Jul. 12, 2002

(65) Prior Publication Data

US 2004/0059013 A1 Mar. 25, 2004

Related U.S. Application Data

(63) Continuation of application No. PCT/NL01/00018, filed on Jan. 12, 2001.

(30) Foreign Application Priority Data

Jan. 14, 2000 (JP) .................................... 2000-006924

(51) Int. Cl.$^7$ ............................... C08F 3/28; C08C 2/46
(52) U.S. Cl. .................... 522/171; 522/173; 522/96; 522/97; 526/301; 526/319; 428/65.2
(58) Field of Search .......................... 522/171, 173, 522/96, 97, 90; 526/301, 319, 210, 212, 223, 224; 428/65.2; 359/741; 528/85

(56) References Cited

U.S. PATENT DOCUMENTS

| | | |
|---|---|---|
| 5,787,218 A | 7/1998 | Ohtaka et al. |
| 5,903,399 A | 5/1999 | Yamashita et al. |
| 2003/0021943 A1 | 1/2003 | Takase et al. .............. 428/65.2 |

FOREIGN PATENT DOCUMENTS

| | | | |
|---|---|---|---|
| JP | 09241336 | * | 9/1997 |
| WO | 96/11965 | | 4/1996 |
| WO | 97/00276 | | 1/1997 |

OTHER PUBLICATIONS

Patent Abstracts of Japan, Vo. 1998, No. 01, English Abstract of JP 09241336, Sep. 16, 1997.

Derwent Publications Ltd., AN—1992–044401, English Abstract of JP 03287641.

* cited by examiner

Primary Examiner—Tatyana Zalukaeva
(74) Attorney, Agent, or Firm—Mayer, Brown, Rowe & Maw LLP

(57) ABSTRACT

The invention relates to a photocurable resin composition comprising: (A) a di or more functional urethane (meth) acrylate compound; (B) a monofunctional (meth)acrylate; (C) a photoinitiator; and (D) a polyoxyalkylene alkyl ether phosphate represented by the following formula (2):

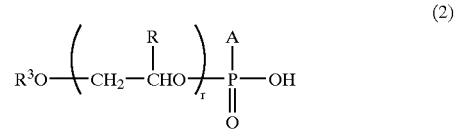

(2)

and to cured products obtained from the resins composition.

8 Claims, No Drawings

PHOTOCURABLE RESIN COMPOSITION AND OPTICAL PARTS

This is a Continuation of International Application No. PCT/NL01/00018 filed Jan. 12, 2001 which designated the U.S.

DETAILED DESCRIPTION OF THE INVENTION

The present invention relates to a photocurable resin composition. More particularly, the present invention relates to a photocurable resin composition useful for forming optical parts, for example, a prism lens sheet used for a backlight of a liquid crystal display and a Fresnel lens sheet or a lenticular lens sheet used for a screen of a projection TV or a backlight using such sheets.

PRIOR ART

Lenses such as a Fresnel lens and a lenticular lens have been manufactured by a press method or a cast method. These methods require a long period of time for manufacturing a lens, thereby resulting in poor productivity. In order to solve this problem, a method of manufacturing a lens using a UV-curable resin has been attempted in recent years. Such a method comprises pouring a UV-curable resin composition between a mold having a lens shape and a transparent resin substrate and curing the composition by irradiating with ultraviolet rays from the side of the substrate to manufacture the lens in a short period of time. Accompanied by the development of thinner and larger projection TVs or video projectors, resins for forming a lens provided with various lens properties such as a higher refractive index and mechanical properties have been proposed and examined. For example, Japanese Patent Application Laid-open No. 2554363/1993 discloses a UV-curable resin composition for a translucent screen which comprises (A) an urethane (meth)acrylate produced by reacting (a) a diol compound produced by reacting bisphenol A with for example ethylene oxide, (b) a diol compound with a molecular weight of 200 or less, (c) an organic polyisocyanate, and (d) a (meth)acrylate containing a hydroxyl group, (B) a compound containing an ethylenically unsaturated group other than the component (A), and (C) a photoinitiator.

PROBLEMS TO BE SOLVED BY THE INVENTION

However, conventional UV curable resin compositions could not produce a cured product that satisfies the required lens properties such as adhesion to substrates, abrasion resistance, and shape restorability.

MEANS FOR SOLVING THE PROBLEMS

The present inventors have conducted extensive studies to solve the problems in conventional resin compositions. As a result the inventors have found that optical parts, in particular, a translucent screen such as a Fresnel lens and a lenticular Ions having a high refractive index and exhibiting excellent releasability from molds, adhesion to substrates, abrasion resistance, and shape restorability can be manufactured by using a cured product of a photocurable resin composition comprising a di or more functional (meth)acrylate compound and a monofunctional (meth)acrylate comprising a phenyl group. However, the past experience of manufacturing translucent screens such as Fresnel lenses from this photocurable resin composition revealed adhesion of the cured resin to metal molds during continuous manufacturing. Thus, further improvement for ensuring continuous manufacturing is necessary. The addition of a hydrocarbon releasing agent, silicone releasing agent, or fluorine-based releasing agent with an intention of improving the phenomenon resulted in unwanted phenomena, for example phase separation, bleed-out and an insufficient releasing effect. No releasing agents exhibited a radical solution. As a result of extensive studies to improve releasability from the mold in continuous manufacturing of translucent screens, the present inventors have found that the addition of a specific amount of polyoxyalkylene alkyl ether phosphate with a specific structure can overcome all of the above-mentioned problems. These findings have led to the completion of the present invention.

Specifically, the present invention provides a photocurable resin composition comprising (A) 10–99,999 wt % of a di or more functional (meth)acrylate compound, (B) 0–70 wt % of a monofunctional (meth)acrylate compound represented by the following formula (1);

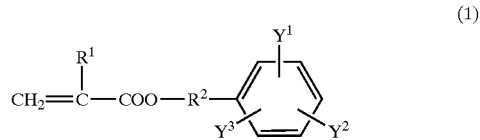

(1)

wherein $R^1$ represents a hydrogen atom or a methyl group, $R^2$ represents —$(CH_2CH_2O)_p$—, —$(CH(CH_3)CH_2O)_q$—, or —$CH_2CH(OH)CH_2O$— (wherein p and q represent integers from 0 to 10), and $Y^1$ to $Y^3$ individually represent a hydrogen atom, a bromine atom, an alkyl group having 1–10 carbon atoms, phenyl group, or —$C(CH_3)_2C_6H_5$;

(C) 0–10 wt % of a photoinitiator; and (D) 0.001–10 wt % of a polyoxyalkylene alkyl ether phosphate represented by the following formula (2),

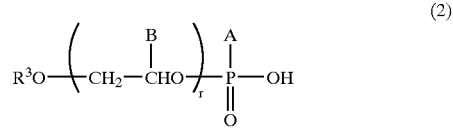

(2)

wherein $R^3$ is an alkyl group having 1–20 carbon atoms or an alkyl substituted phenyl group, r is an integer from 1 to 15, and A is a hydroxyl group or $R^4O(CH_2CHBO)_s$—, wherein $R^4$ is an alkyl group having 1–20 carbon atoms or an alkyl substituted phenyl group, s is an integer from 1 to 15, and B represents a hydrogen atom or methyl group.

PREFERRED EMBODIMENTS OF THE INVENTION

In on preferred embodiment of the above photocurable resin composition, the component (A) is an urethane (meth)acrylate produced by reacting a diol compound of the following formula (3), a polyether polyol with a number average molecular weight of 500 or more which comprises an alkyleneoxy structure in the molecule, an organic polyisocyanate compound, and a (meth)acrylate containing a hydroxyl group:

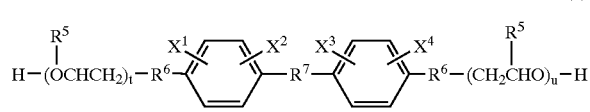

wherein $R^5$ individually represents a hydrogen atom or a methyl group, $R^6$ individually represents an oxygen atom or sulfur atoms, $R^7$ is a group —$CH_2$—, —$C(CH_3)_2$—, —S—, —SO—, or —$SO_2$—, $X^1$ to $X^4$ individually represents a hydrogen atom, methyl group, or bromine atom, and t and u individually represent an integer from 0 to 9.

The present invention further provides optical parts comprising a cured product of the above photocurable resin composition.

The component (A) of the photocurable resin composition of the present invention is preferably an urethane (meth) acrylate obtainable by reacting at least a polyether polyol with a number average molecular weight of 500 or more which comprises an alkyleneoxy structure in the molecule, an organic polyisocyanate compound, and a (meth)acrylate containing a hydroxyl group.

Examples of the polyether polyol having an alkyleneoxy structure in the molecule include polyethylene glycol, polypropylene glycol, polytetramethylene glycol, polyhexamethylene glycol, polyheptamethylene glycol, polydecamethylene glycol, and a polyether diol produced by the ring-opening copolymerization of at least two ion-polymerizable cyclic compounds. Examples of the ion-polymerizable cyclic compounds are cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate. Specific examples of the combinations of at least two ion-polymerizable cyclic compounds are binary copolymers of tetrahydrofuran and propylene oxide, tetrahydrofuran and 2-methyltetrahydrofuran, tetrahydrofuran and 3-methyltetrahydrofuran, tetrahydrofuran and ethylene oxide, and butene-1-oxide and ethylene oxide, and ternary copolymers of tetrahydrofuran, butene-oxide, and ethylene oxide, and tetrahydrofuran, butene-1-oxide, and ethylene oxide can be given. A polyether diol produced by the ring-opening copolymerization of these ion-polymerizable cyclic compounds and cyclic imines such as ethyleneimine, cyclic lactonic acids such as β-propyolactone and glycolic acid lactide, or dimethylcyclopolysiloxanes can also be used. The ring-opening copolymers of the ion-polymerizable cyclic compounds may be either a random copolymer or a block copolymer The polystyrene-reduced number average molecular weight of these polyether polyols is 500 or more. If the number average molecular weight is less than 500, increased viscosity of the resin composition may cause problems in the manufacturing process or lens properties such as adhesion to substrates, abrasion resistance, and shape restorability may be insufficient. Examples of commercially available products of the above polyether polyols include PTMG650, PTMG1000. PTMG2000 (manufactured by Mitsubishi Chemical Corp.), PPG700, PPG1000, EXCENOL2020, 1020 (manufactured by Asahi Glass Urethane Co., Ltd.), PEG1000, UNISAFE DC1100, DC1800) (manufactured by Nippon Oil and Fats Co., Ltd.), PTG650, PTG1000, PTG2000, PTG3000, PPTG2000, PPTG1000, PTGL1000, PTGL2000 (manufactured by Hodogaya Chemical Co., Ltd.), Z-3001-4, Z-3001-5, PBG2000 and PBG2000B (manufactured by Daiichi Kogyo Seiyaku Co., Ltd.)

Examples of the organic polyisocyanate compound used for producing the urethane (meth)acrylate (A) are 2,4-tolylene diisocyanate, 2,6-tolylene diisocyanate, 1,3-xylylene diisocyanate 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, and 1,1'-biphenylene diisocyanate can be given. Of these, 2,4-tolylene diisocyanate, 2,6-tolylene diisocyanate, 1,3-xylylene diisocyanate, and 1,4-xylylene diisocyanate are particularly preferable.

Examples of the hydroxyl group-containing (meth) acrylate compound used for the preparation of the urethane (meth)acrylate of component (A) are (meth)acrylate compounds such a compound are 2-hydroxyethyl (meth) acrylate, 2-hydroxypropyl (meth)acrylate, 2-hydroxybutyl (meth)acrylate, 2-hydroxy-3-phenyloxypropyl (meth) acrylate, 1,4-butanediol mono(meth)acrylate, 2-hydroxyalkyl(meth)acryloyl phosphate, 4-hydroxycyclohexyl(meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, and (meth)acrylates represented by the following structural formula (4):

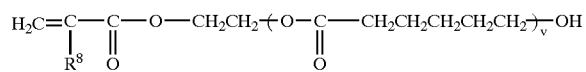

wherein $R^0$ represents a hydrogen atom or a methyl group and v is an integer from 1 to 15.

Compounds produced by the addition reaction of (meth) acrylic acid and a compound containing a glycidyl group such as alkyl glycidyl ether, allyl glycidyl ether, and glycidyl (meth)acrylate can also be used. These hydroxyl group-containing (meth)acrylates may be used either individually or in combination of two or more.

The urethane (meth)acrylate (A) is obtainable by reaction of the above three components with the diol shown by the formula (3). The urethane (meth)acrylate produced by reacting these four components is particularly preferable.

In formula 3 t and u represent integers from 0 to 9, and preferably from 1 to 9. Examples of the diol shown by the formula (3) are an ethylene oxide addition product of bisphenol A (t=u=1.3), ethylene oxide addition product of bisphenol A (t=u=2), ethylene oxide addition product of bisphenol A (t=u=5), propylene oxide addition product of bisphenol A (t=u=1.1), propylene oxide addition product of bisphenol A (t=u=1.5), propylene oxide addition product of bisphenol A (t=u=3), ethylene oxide addition product of bisphenol F (t=u=2), ethylene oxide addition product of bisphenol F (t=u=4), propylene oxide addition product of bisphenol F (t=u=2), ethylene oxide addition product of bisphenol S (t=u=2), propylene oxide addition product of bisphenol S (t=u=2) and ethylene oxide addition product of tetrabromobisphenol A (t=u=2). The polystyrene-reduced number average molecular weight of the diol shown by the formula (3) is preferably 1000 or less.

Examples of commercially available products of the diol shown in formula (3) are DA-400, DA-550, DA-700, DB-400, DB-530, DB-900 and DAB-800 (manufactured by Nippon Oil and Fats Co., Ltd.).

The urethane(meth)acrylate (component (A)), obtainable by reaction of the following four components: a polyol having an alkyleneoxy structure in the molecule, a diol represented by the formula (3) (these diol and polyether polyol may be together referred to as two polyols), an organic polyisocyanate compound, and a hydroxyl group-containing (meth)acrylate, is preferably produced with the following methods; (1) a method of charging the above one or two polyols, organic polyisocyanate compound, and hydroxyl group-containing (meth)acrylate and reacting these compounds all together, (2) a method of reacting the above one or two polyols and the organic polyisocyanate compound, and reacting the resulting product with the hydroxyl group-containing (meth)acylate; (3) a method of reacting the organic polyisocyanate compound and the hydroxyl group-containing (meth)acrylate, and reacting the resulting product with the above one or two polyols; and (4) a method of reacting the organic polyisocyanate compound and the hydroxyl group-containing (meth)acrylate, reacting the resulting product with the above one or two polyols, and then reacting the resulting product with the hydroxyl group-containing (meth)acrylate. Of the methods described above, the method of reacting the organic polyisocyanate compound and the hydroxyl group-containing (meth)acrylate, and reacting the resulting product with the above one or two polyols is particularly preferable for producing the urethane (meth)acrylate of the present invention.

When producing the urethane (meth)acrylate (A), it is preferable to add the one or two polyols, and organic polyisocyanate compound, and a hydroxyl group-containing (meth)acrylate so that isocyanate groups included in the organic polyisocyanate compound and hydroxyl groups included in the hydroxyl group-containing (meth)acrylate are respectively 1.1–1.5 equivalent and 0.1–0.5 equivalent for one equivalent of hydroxyl groups included in the one or two polyols.

The urethane (meth)acrylate (A) preferably contains the one or two polyols in the molecule by the reaction with the organic isocyanate compound. The preferable ratio of the diol shown by the formula (3) is 10–70 wt % and that of the polyether polyol is 30–90 wt %. If the urethane (meth)acrylate (A) does not contain both of the two polyols in the molecule, the cured product does not satisfy the objective retractive index or modulus of elasticity, whereby the performance as optical parts is inadequate.

In the reaction of these three or four components, an urethanization catalyst such as copper naphthenate, cobalt naphthenate, zinc naphthenate, di-n-butyl tin dilaurate, triethylamine, and triethylenediamine-2-methyltriethyleneamine is added in an amount from 0.01 to 1 wt % for the total amount of the raw materials. The reaction is carried out preferably at 10–90° C., and particularly preferably at 30–80° C.

The number average molecular weight of the urethane (meth)acrylate (A) is preferably from 1,000 to 20,000, and particularly preferably from 1,500 to 15,000. If the number average molecular weight of the urethane (meth)acrylate (A) is less than 1,000, the modulus of elasticity of the cured product produced by curing the resin composition increases extremely, thereby causing a break or crack when used as a lens. If the number average molecular weight exceeds 20,000, handling of the resin composition may become difficult due to the increased viscosity.

The urethane (meth)acrylate (A) is added to the resin composition in an amount preferably from 20 to 80 wt. %, and still more preferably from 30 to 70 wt. %. The lower limit of this range must be observed for providing the cured product with appropriate mechanical properties such as mechanical strength and toughness, preventing a break or crack when used as a lens sheet, and ensuring easy restoration of the lens shape when crushed. The upper limit of this range must be observed for preventing the workability or applicability from decreasing due to the increased viscosity of the composition.

All amount of components A–D, as described in this invention, are relative to the total amount of components A+B+C+D of the composition The monofunctional (meth)acrylate (B) is added for providing both good adhesion to the substrate, a favorable refractive index and for ensuring sufficient mechanical properties and applicability. Preferably, a compound (B) as represented by formula (1) is used. Examples of the component (B) include phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl-2-hydroxypropyl (meth)acrylate, (meth)acrylate of p-cumylphenol which is reacted with ethylene oxide, 2-bromophenoxyethyl (meth) acrylate, 2,4-dibromophenoxyethyl (meth)acrylate and 2,4,6 tribromophenoxyethyl (meth)acrylate. Of these, phenoxyethyl (meth)acrylate, phenoxyethoxyethyl (meth)acrylate, (meth)acrylate of p-cumylphenol reacted with ethylene oxide, and 2,4,6-tribromophenoxyethyl (meth)acrylate are particularly preferable.

Examples of commercially available products used as the component (B) are Aronix M110, M101, M6700, TO-1317 (manufactured by Toagosei Co., Ltd.), Viscoat #192, #193, #220, 3BM (manufactured by Osaka Organic Chemical Industry Co., Ltd.), NK Ester AMP-10G, AMP-20G (manufactured by Shin-Nakamura Chemical Co., Ltd.), Light Acrylate PO-A, P-200A, Epoxy Ester M-600A (manufactured by Kyoeisha Chemical Co., Ltd.), PHE, CEA, PHE-2, BR-31, BR-31M are BR-32 (manufactured by Daiichi Kogyo Seiyaku Co., Ltd.)

The proportion of the component (B) added to the composition is preferably 10–70 wt. %, and particularly preferably 20–60 wt. %. The lower limit of this range is specified for providing both adhesion to substrates and a refractive index. The upper limit of this range is specified for ensuring sufficient mechanical properties and applicability.

In the present invention, a compound having a (meth) acryloyl group or a vinyl group other than the component (B) can be used as an optional component (hereinafter referred to as "unsaturated monomer"). As the unsaturated monomer, a monofunctional monomer and a polyfunctional monomer can be used. Examples of the monofunctional monomer are a vinyl monomer such as N-vinylpyrrolidone, N-vinylcaprolactam, vinylimidazole, and vinylpyridine, isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 1-butylcyclohexyl (meth)acrylate, acryloylmorpholine, 2-hydroxyethyl (meth)acrylate, 2-hydroxypropyl (meth)acrylate, 2-hydroxybutyl (meth) acrylate, methyl (meth)acrylate, ethyl (meth)acrylate, propyl (meth)acrylate, isopropyl (meth)acrylate, butyl (meth) acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth) acrylate, isostearyl (meth)acrylate, tetrahydrofurfuryl (meth)acrylate, butoxyethyl (meth)acrylate, ethoxydiethylene glycol (meth)acrylate, polyethylene glycol mono(meth) acrylate, polypropylene glycol mono(meth)acrylate, methoxyethylene glycol (meth)acrylate, ethoxyethyl (meth) acrylate, methoxypolyethylene glycol (meth)acrylate, methoxypolypropylene glycol (meth)acrylate, diacetone (meth)acrylate, isobutoxymethyl(meth)acrylate, N,N-dimethyl(meth)acrylate, t-octyl(meth)acrylamide, dimethylaminoethyl (meth)acrylate, diethylaminoethyl (meth) acrylate, 7-amino-3,7-dimethyloctyl (meth)acrylate, N,N-diethyl(meth)acrylamide, N,N-dimethylaminopropyl(meth) acrylamide, hydroxy butyl ether, lauryl vinyl ether, cetyl vinyl ether, 2-ethylhexyl vinyl ether, and monofunctional monomers shown by the following formulas (5) and (6)

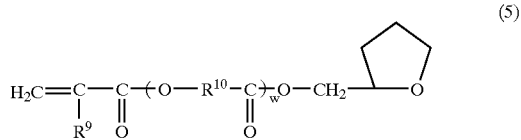

(5)

wherein $R^9$ is a hydrogen atom or a methyl group, and $R^{10}$ is an alkylene group having 2 to 8 carbon atoms, and w is an integer from 1 to 8.

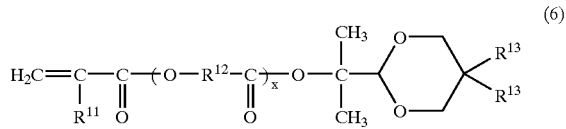

(6)

wherein $R^{11}$ and $R^{13}$ are individually a hydrogen atom or a methyl group, and $R^{12}$ is an alkylene group having 2 to 8 carbon atoms, and x is an integer from 1 to 8.

Examples of commercially available products of the monofunctional monomers, Aronix M111, M113, M117 (manufactured by Toagosei Co., Ltd.), LA, IBXA, Viscoat #190, #2000 (manufactured by Osaka Organic Chemical Industry Co., Ltd.), Light Acrylate EC-A, PO-A, NP-4EA, NP-BEA, HOA-MPL (manufactured by Kyoeisha Chemical Co., Ltd.), KAYARAD TC110S, R629, R644 (manufactured by Nippon Kayaku Co., Ltd.), FA-511A, 512A, 513A (manufactured by Hitachi Chemical Co., Ltd.), VP (manufactured by BASF), ACMO, DMAA, DMAPAA (manufactured by KOHJIN Co., Ltd.), can be given.

Examples of the polyfunctional monomers are acrylate compounds such as trimethylolpropane tri(meth)acrylate, pentaerythritol tri(meth)acrylate, ethylene glycol di(meth) acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth) acrylate, trimethylolpropanetrioxyethyl (meth)acrylate, tris (2-hydroxyethyl)isocyanurate tri(meth)acrylate, tris(2-hydroxyethyl)isocyanurate di(meth)acrylate, bis (hydroxymethyl)tricyclodecane di(meth)acrylate, dipentaerythritol hexa(meth)acrylate, di(meth)acrylate of a diol which is an addition product of polyethylene oxide or propylene oxide to bisphenol A, di(meth)acrylate of a diol which is an addition product of ethylene oxide or propylene oxide to hydrogenated bisphenol A, epoxy(meth)acrylate produced by adding (meth)acrylic acid to a reaction product of diglycidyl ether and bisphenol A, and triethylene glycol divinyl ether can be given.

Examples of commercially available products of the polyfunctional monomers, Yupimer UV SA1002, SA2007 (manufactured by Mitsubishi Chemical Corp.), Viscoat #195, #230, #215, #260, #335HP, #295, #300, #360, #700, GPT, 3PA (manufactured by Osaka Organic Chemical Industry Co., Ltd.), Light Acrylate 4EG-A, 9EG A, NP-A, DCP-A, BP4EA, BP4PA, TMP-A, PE-3A, PE-4A, DPE-6A (manufactured by Kyoeisha Chemical Co., Ltd.), KAYARAD PET-30, TMPTA, R-604, DPHA, DPCA-20,-30,-60,-120, HX 620, D-310, D-330 (manufactured by Nippon Kayaku Co., Ltd.), Aronix M-208, M-210, M-715, M-220, M-240, M-305, M-309, M-310, M-315, M-325, M400 (manufactured by Toagosei Co., Ltd.), Ripoxy VR-77, VR-60, VR-90 (manufactured by Showa Highpolymer Co., Ltd.) can be given.

The photocurable resin composition of the present invention is cured by radiation. Radiation used herein includes ionizing radiation such as infrared rays, visible rays, ultraviolet rays, X-rays, electron beams, ι-rays, ⌐-rays, n-rays. Component (C), the photoinitiator, is required for curing the composition and a photosensitizer is optionally added. As the photoinitiator, any compound that decomposes upon irradiation and generates radicals to initiate the polymerization can be used. Examples of such compounds include acetophenone, acetophenone benzyl ketal, 1 hydroxycyclohexyl phenyl ketone, 2,2-dimethoxy-2-phenylacetophenone, xanthone, fluorenone, benzaldehyde, fluorene. anthraquinone, triphenylamine, carbazole, 3-methylacetophenone, 4-chlorobenzophenone, 4,4'-dimethoxybenzophenone, 4,4'-diaminobenzophenone. Michler's ketone, benzoin propyl ether, benzoin ethyl ether, benzyl dimethyl ketal, 1-(4-isopropylphenyl)-2-hydroxy-2-methylpropan 1 one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4, 6-trimethylbenzoyl diphenylphosphine oxide, and bis-(2,6-dimethoxybenzoyl)-2,4,4-trimethylpentylphosphine oxide.

Examples of commercially available products of the photoinitiator are Irgacure 184, 369, 651, 500, 819, 907, 784, 2959, CGI-1700, CGI-1750, CGI-1850, CG24-61, Darocur 1116, 1173 (manufactured by Ciba Specialty Chemicals Co., Ltd.), Lucirin TPO, LR8893, LR8970 (manufactured by BASF), Ubecryl P36 (manufactured by UCB).

Examples of the photosensitizer are triethylamine, diethylamine, N-methyldiethanoleamine, ethanolamine, 4-dimethylaminobenzoic acid, methyl 4-dimethylaminobenzoate, ethyl 4-dimethylaminobenzoate, and isoamyl 4 dimethylaminobenzoate. As commercially available products of the photosensitizer, Ubecryl P102, 103, 104, and 105 (manufactured by UCB) can be given.

The optimum amount of the photoinitiator used to cure the resin composition of the present invention is from 0.01 to 10 wt. %, and preferably from 0.5 to 7 wt. % of the total amount of the composition. The above upper limit is desirable in view of ensuring superior curing characteristics of the composition, mechanical and optical characteristics of cured products, and handling easiness; and the lower limit is desirable for preventing decrease in the curing speed.

A heat-polymerization initiator can be optionally added when curing the resin composition of the present invention. Peroxides and azo compounds are preferable heat-polymerization initiators. Specific examples include benzoyl peroxide, t-butyl peroxybenzoate and azobisisobutyronitrile.

As the alkyl-substituted phenyl group in the formula (2) showing the polyoxyalkylene ether phosphate of component (D) in the present invention, phenyl groups substituted by an alkyl group having 1–20 carbon atoms are preferable. The component (D) can be either mono-phosphate or di phosphate according to the type of group A Either mono-phosphate or di-phosphate is acceptable in the present invention. Examples of the polyoxyalkylene alkyl ether phosphate used as the component (D) include polyoxyethylene alkyl ether mono- or di-phosphate, polyoxypropylene alkyl ether mono- or di-phosphate, polyoxyethylene alkyl-substituted phenyl ether mono- or di-phosphate, and polyoxypropylene alkyl-substituted phenyl ether mono- or di-phosphate. Given as specific examples of commercially available products of polyoxyalkylene alkyl ether phosphate used as the component (D) are Plysurf AL, A -208S, A-208B, A208F, A-210B, M208F, A-215C, A-212C, A-217E (manufactured by Dallchl Kogyo Seiyaku Co., Ltd.). Antox EHD-200, Newcol 1000FCP, 565-PS, 1120-PS, Paracol OP (manufactured by Nippon Nyukazai Co., Ltd.).

The amount of polyoxyalkylene alkyl ether phosphate used as the component (D) in the resin composition of the present invention is preferably 0.001–10 wt. %, and particularly 0.01–5 wt. %. If less than 0.001 wt % of compound (D) is added, releasability from metal molds during continuous manufacturing is insufficient; if more than 10 wt % of compound (D) is added, liquid bleeds may appear on the surface of cured products, impairing external appearance of final products and performance of lenses.

Curable oligomers or polymers other than the above components may be added to the resin composition of the present invention insofar as the characteristics of the resin composition are not adversely affected. Examples of such curable oligomers or polymers are polyurethane (meth)acrylate other than the component (A), polyester (meth)acrylate, epoxy (meth)acrylate, polyamide (meth)acrylate, siloxane polymers having a (meth)acryloyloxy group, and reactive polymers produced by reacting a copolymer of glycidyl methacrylate and other polymerizable monomers with (meth)acrylic acid.

In addition to the above components, additives such as antioxidants, UV absorbers, light stabilizers, silane coupling agents, coating surface improvers, heat-polymerization inhibitors, leveling agents, surfactants, coloring agents, preservatives, plasticizers, lubricants, solvents, fillers, aging preventives, wettability improvers, can be added as required. Examples of antioxidants include Irganox1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.),; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.),; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.),; examples of silane coupling agents include
γ-aminopropyltriothoxysilano,
γ-mercaptopropyltrimethoxysilane, and
γ-methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.); examples of coating surface improvers include silicone additives such as dimethylsiloxane polyether and commercially available products such as DC-57, DC-190 (manufactured by Dow-Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), and L-700, L-7002, L-7500, FK-024-90 (manufactured by Nippon Unicar Co., Ltd.).

The resin composition of the present invention is manufactured by mixing the above components using a conventional method. Viscosity of the resin composition of the present invention thus prepared is usually from 200 to 50,000 mPa·s/25° C., and preferably from 500 to 30,000 mPa·s/25° C. If the viscosity is too high, uneven coating or crinkling occurs or the objective lens thickness cannot be secured, thereby resulting in inadequate lens performance if the viscosity is too low, on the other hand, it is difficult to control the lens thickness and therefore to manufacture lenses with a uniform thickness.

It is particularly preferable that the cured product prepared by curing the resin composition of the present invention by radiation has the following properties.

The cured product produces a temperature dependency curve of a loss tangent having at least two peaks or shoulders at a temperature range between −150 and 100° C. when an oscillation frequency of 10 Hz is applied using a dynamic viscoelasticity measuring device. If a translucent screen such as a lens sheet is formed from the resin composition of which the cured product satisfies this property, such a translucent screen exhibits superior adhesion to substrates, shape restorability, and moderate mechanical properties. Therefore, the lens projection is protected from abrasion or fracture. Even if the lens projection is crushed, the original shape can be immediately restored.

The refractive index of the cured product at 25° C. is preferably 1.53 or more, and still more preferably 1.54 or more. If the refractive index is less than 1.53, a translucent screen formed from the resin composition may exhibit insufficient frontal brightness.

When pulling the cured product at a rate of 10 mm/min., the Young's modulus of elasticity is preferably between 0.5 kg/mm$^2$ and 30 kg/mm2. (The Young's modulus of elasticity (hereinafter referred to as "modulus of elasticity") of the cured product was determined from the stress at which the distortion amount is 2%). If the modulus of elasticity is more than 30 kg/mm$^2$, the lens projection may be broken or be abraded when using the resin composition as a lens sheet, possibly rendering the lens performance inadequate. If the modulus of elasticity is less than 0.5 kg/mm$^2$, the lens performance may be inadequate because the lens projection is crushed when superposing the lenses, or it is difficult to remove the lens from the mold, which may result in inefficient production.

EXAMPLES

The present invention will be explained in more detail by examples, which are not intended to be limiting of the present invention.

Examples 1–4 and Comparative Examples 1–4

Synthesis Example 1 of Urethane (meth)acrylate

A reaction vessel equipped with a stirrer was charged with 24.21 wt % of 2,4-tolylene diisocyanate, 0.08 wt % of di-n-butyltin dilaurate, and 0.03 wt % of 2,6-di-t-butyl-p-cresol. The mixture was cooled to 5–10° C. 10.76 wt % of 2-hydroxyethyl acrylate was added drop wise while stirring so as to maintain the temperature at 30° C. or lower. After the addition, the mixture was reacted for one hour at 30° C. 46.37 wt % of polytetramethylene glycol with a number average molecular weight of 1,000 was then added and the mixture was reacted at 50° C. for one hour. After the addition of 18.55 wt % of an ethylene oxide addition product of bisphenol A (t=u=2.0), the mixture was reacted at 50–70° C. for two hours. The reaction was terminated when the residual isocyanate was 0.1 wt % or less. The resulting urethane acrylate is referred to as "A-1".

Synthesis Example 2 of Urethane (meth)acrylate

A reaction vessel equipped with a stirrer was charged with 25.48 wt % or 2,4-tolylene diisocyanate, 0.08 wt % of di-n-butyltin dilaurate, and 0.03 wt % of 2,6 di butyl p cresol. The mixture was cooled to 5–10° C. 8.50 wt % of 2-hydroxyethyl acrylate was added drop wise while stirring so as to maintain the temperature at 30° C. or lower. After the addition, the mixture was reacted for one hour at 30° C. 36.62 wt % of polypropylene glycol with a number average molecular weight of 1,000 was then added and the mixture was reacted at 50° C. for one hour After the addition of 29.29 wt % of an ethylene oxide addition product of bisphenol A (t=u=2.0), the mixture was reacted at 50–70° C. for two hours. The reaction was terminated when the residual isocyanate was 0.1 wt % or less. The resulting urethane acrylate is referred to as "A-2".

Synthesis Example 3 of Urethane (meth)acrylate

A reaction vessel equipped with a stirrer was charged with 24.48 wt % of 2,4-tolylene diisocyanate, 0.08 wt % of di-n-butyltin dilaurate, and 0.03 wt % of 2,6-di-t-butyl-p-cresol The mixture was cooled to 5–10° C. 15.62 wt % of 2-hydroxy-3-phenyloxypropy acrylate was added drop wise while stirring so as to maintain the temperature at 30° C. or lower. After the addition, the mixture was reacted for one hour at 30° C. 45.72 wt % of polytetramethylene glycol with a number average molecular weight of 650 was then added and the mixture was reacted at 50° C. for one hour. After the addition of 14.07 wt % of an ethylene oxide addition product of bisphenol A (t=u=2.0), the mixture was reacted at 50–70° C. for two hours. The reaction was terminated when the residual isocyanate was 0.1 wt % or less. The resulting urethane acrylate is referred to as "A-3".

Synthesis Example 4 of Urethane (meth)acrylate

A reaction vessel equipped with a stirrer was charged with 37.14 wt % of 2,4-tolylene diisocyanate, 0.08 wt % of di-n-butyltin dilaurate, and 0.03 wt % of 2,6-di-t-butyl-p cresol. The mixture was cooled to 5–10° C. 16.50 wt % of 2-hydroxyethyl acrylate was added drop wise while stirring so as to maintain the temperature at 30° C. or lower. After the addition, the mixture was reacted for one hour at 30° C. 17.79 wt % of polytetramethylene glycol with a number average molecular weight of 250 was then added and the mixture was reacted at 50° C. for one hour. After the addition of 28.46 wt % of an ethylene oxide addition product of bisphenol A (t=u=2.0), the mixture was reacted at 50–70° C. for two hours. The reaction was terminated when the residual isocyanate was 0.1 wt % or less. The resulting urethane acrylate is referred to as "CA-1".

Example 1

A reaction vessel equipped with a stirrer was charged with 38.8 wt % of "A-1" as component (A), 24.3 wt % of phenoxyethyl acrylate and 11.7 wt % of acrylate of p-cumylphenol to which ethylene oxide was added as component (B), 2.8 wt % of 1-hydroxycyclohexyl phenyl ketone as component (C), 0.6 wt % of Plysurf A-208B as component (D), 10.7 wt % of epoxy (meth)acrylate produced by adding acrylate to diglycidyl ether of bisphenol A, 11.2 wt % or diacrylate of diol which is a polyethylene oxide addition product of bisphenol A, and 0.5 wt % of SH-190 which is a coating surface improver as other components. The mixture was stirred for one hour while maintaining the liquid temperature at 50–60° C. to obtain a liquid curable resin composition with a viscosity of 7,100 mPa·s/25° C.

As for Examples 2–4 and Comparative Examples 1–4, liquid resin compositions were obtained by charging the reaction vessel with the components shown in Table 1 and reacting the components.

Evaluation Methods

Test specimens were prepared using the liquid curable resin compositions obtained in the examples according to the method described below. The viscosity, refractive index, Young's modulus, releasability from metal molds during continuous manufacturing, adhesion to substrates, abrasion resistance, shape restorability of the test specimens were measured according to the following methods.

(1) Viscosity Measurement

The viscosity at 25° C. was measured using a rotational viscometer according to JIS K7117.

(2) Measurement of Refractive Index

The refractive index at 25° C. of the test specimen prepared above was measured according to JIS K7105 using an Abbe's refractometer (manufactured by Atago Co., Ltd.).

(3) Measurement of Young's Modulus

The stress ($\sigma$) at a distortion ($\Delta l$) of 2% was measured at a drawing rate of 10 mm/min using a tensile tester (manufactured by Shimadzu Corp.). The Young's modulus defined by the following formula was calculated. Young's modulus $\sigma/\Delta l$ (4) Releasability from Metal Molds During Continuous Manufacturing Liquid curable resin compositions shown in Table 1 were fed to the space between a Fresnel lens mold and a PMMA substrate (10 cm×10 cm) with a thickness of 2 mm, and the PMMA substrate was pressed to prepare resin composition layers with a uniform thickness. The resin layer was cured by irradiating with ultraviolet rays at a dose of 1.0 J/cm$^2$ from the side of the substrate. The cured resin (hereinafter referred to as "lens substrate") was removed from the mold by hand. After repetition this procedure 30 times, a cured film easily removed from the mold was evaluated as AAA, a cured film removed with some force was evaluated as BBB, and a cured film which was not removed, with part of the resin layer adhering to the mold, was evaluated as CCC.

(5) Adhesion to Substrates

Lens substrates removed from the above lens molds were evaluated by measuring adhesiveness with the PMMA substrates by a cross cut peeling test according to JIS K5400. A lens substrate for which the square was not peeled from the PMMA substrate but adhered perfectly to the PMMA substrate was evaluated as AAA, a lens substrate for which part of the squares was peeled from the PMMA substrate was evaluated as BBB, and a lens substrate for which all the squares were peeled from the PMMA substrate was evaluated as CCC.

(6) Abrasion Resistance

Two sheets of the lens substrate removed from the lens mold were superposed at the lens surfaces by applying a predetermined pressure. The abrasion resistance was evaluated by oscillating one lens substrate while securing the other lens substrate. The surface conditions of the lens was observed after oscillating the lens substrate for 5 minutes at the oscillating cycle resulting in a back-and-forth movement twice a second at an interval of 4 cm. A lens with no abrasion or broken parts was rated as AAA, a lens substrate with some abrasion or broken parts was rated as BBB, and a lens substrate with abrasion or broken parts over the entire surface was rated as CCC.

(7) Shape Restorability

A metal ball indenter with a diameter of 0.4 mm was pressed into the lens surface of the lens substrate removed from the lens mold with a 30 g load for one minute A period of time required for the ball mark on the lens surface to disappear was measured. A lens substrate for which the ball mark disappeared within 30 minutes was evaluated as AAA, a lens substrate for which the ball mark disappeared in more than 30 minutes but one hour or less was evaluated as BBB, and a lens substrate for which the ball mark did not disappear after one hour was evaluated as CCC.

F-3: Epoxy acrylate produced by adding acrylic acid to a reaction product of diglycidyl ether and bisphenol A, Mn=510: "Ripoxy VR-77" manufactured by Showa High-polymer Co., Ltd.

E-4 Diacrylate of diol of bisphenol A to which 4 mols of ethylene oxide was added, Mn=512: "Viscoat 700" manufactured by OsaKa Organic Chemical Industry Co., Ltd.

E-5: Dipentaerythritol hexaacrylate "DPHA" manufactured by Nippon Kayaku Co., Ltd.

F-1: Coating surface improver "SH 190" manufactured by Toray-Dow Corning Silicone Co., Ltd.

(Mn indicates a polystyrene-reduced number average molecular weight determined by a GPC method)

What is claimed is:

1. A photocurable resin composition comprising:
(A) 10–99,999 wt % of a di or more functional urethane (meth)acrylate compound, said urethane (meth)acrylate

TABLE 1

| | | Example | | | | Comparative Example | | | |
|---|---|---|---|---|---|---|---|---|---|
| | | 1 | 2 | 3 | 4 | 1 | 2 | 3 | 4 |
| Component (A) | A-1 | 38.3 | | | | 38.8 | | | |
| | A-2 | | 51.4 | | | | 51.5 | | 51.5 |
| | A-3 | | | 45.3 | 38.67 | | | | |
| Other component | CA-1 | | | | | | | 38.7 | |
| Component (B) | B-1 | 24.3 | 28.2 | 21.2 | 35.7 | 24.3 | 28.2 | 24.3 | |
| | B-2 | 11.7 | 11.7 | 15.5 | | 1.7 | 1.7 | 11.7 | |
| Component (C) | C-1 | 2.8 | 2.8 | 2.9 | 2.9 | 2.8 | 2.8 | 2.8 | 2.8 |
| Component (D) | D-1 | 0.5 | | | | | | | |
| | D-2 | | 0.1 | | 0.03 | | | 01 | |
| | D-3 | | | 1.0 | | | | | |
| Other component | E-1 | | | | | | | | 28.2 |
| | E-2 | | 5.3 | 8.7 | | | 5.3 | | 5.3 |
| | E-3 | 10.7 | | 4.9 | 10.6 | 10.7 | | 10.7 | 11.7 |
| | E-4 | 11.2 | | | 9.7 | 11.2 | | 11.2 | |
| | E-5 | | | | 1.9 | | | | |
| | F-1 | 0.5 | 0.5 | 0.5 | 0.5 | 0.5 | 0.5 | 0.5 | 0.5 |
| Liquid characteristics | Viscosity (mPa · s/25° C.) | 7100 | 10000 | 7300 | 7100 | 7200 | 10000 | 16000 | 12000 |
| Characteristics of cured product | Refractive index ($n_D^{25}$) | 1.553 | 1.547 | 1.550 | 1.551 | 1.553 | 1.547 | 1.563 | 1.527 |
| | Young's modulus (kg/mm$^2$) | 6 | 5 | 6 | 12 | 16 | 5 | 58 | 9 |
| | Releasability from metal molds during continuous manufacturing | AAA | AAA | AAA | AAA | CCC | BBB | AAA | CCC |
| | Adhesion to substrate | AAA | AAA | AAA | AAA | AAA | AAA | BBB | CCC |
| | Abrasion resistance | AAA | AAA | AAA | AAA | AAA | AAA | CCC | AAA |
| | Shape restorablity | AAA | AAA | AAA | AAA | AAA | AAA | CCC | BBB |

The components shown in Table 1 were as follows.

Component (B):

B-1: Phenoxyethyl acrylate: "New Frontier PHE" manufactured by Daiichi Kogyo Seiyaku Co., Ltd.

B-2: Acrylate of p-cumylphenol to which 2 mols of ethylene oxide was added, Mn-354: "ARONIX M110" manufactured by Toagosei Co., Ltd.

Component (C)

C-1: 2-Hydroxy cyclohexyl-benzophenone; "Irgacure 184" manufactured by Ciba Specialty Chemicals Co., Ltd.

Component (D)

D-1: Plysurf M-208B, manufactured by Daiichi Kogyo Seiyaku Co., Ltd.

D-2: Plysurf A-208F, manufactured by Daiichi Kogyo Seiyaku Co., Ltd.

D-3: Newcol 1000FCP, manufactured by Nippon Nyukazai Co., Ltd.

Other Components

E-1: Isobornyl acrylate: "IBXA" manufactured by Osaka Organic Chemical Industry Co., Ltd.

E-2: N-vinylpyrrolidone: N-vinylpyrrolidone manufactured by BASF compound being obtained by reacting a polyether polyol with a number average molecular weight of 500 or more which comprises an alkyleneoxy structure in the molecule, an organic polyisocyanate compound, and a (meth)acrylate compound containing a hydroxyl group, (B) 0–70 wt % of a monofunctional (meth)acrylate compound, (C) 0–10 wt % of a photoinitiator; and (D) 0,001–10 wt % of a polyoxyalkylene alkyl ether phosphate represented by the following formula (2):

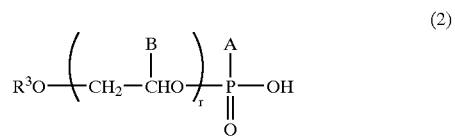

wherein R$^3$ is an alkyl group having 1–20 carbon atoms or an alkyl-substituted phenyl group, r is an integer from 1 to 15, and A is a hydroxyl group or R$^4$O ($CH_2CHBO)_s$—, wherein $R^4$ is an alkyl group having 1–20 carbon atoms or an alkyl-substituted phenyl group, s is an integer from 1 to 15, and B represents a hydrogen atom or methyl group.

2. The photocurable resin composition according to claim 1, wherein compound (B) is a monofunctional (meth)acrylate compound represented by the following formula (1);

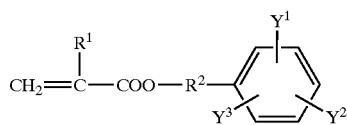

(1)

wherein $R^1$ represents a hydrogen atom or a methyl group, $R^2$ represents —$(CH_2CH_2O)_p$—, —$(CH(CH_3)CH_2O)_q$—, or —$CH_2CH(OH)CH_2O$— (wherein p and q represent integers from 0 to 10), and $Y^1$ to $Y^3$ individually represent a hydrogen atom, bromine atom, an alkyl group having 1–10 carbon atoms, phenyl group, or —$C(CH_3)_2C_6H_5$.

3. The photocurable resin composition according to claim 1, wherein the component (A) is a urethane (meth)acrylate produced by reacting a diol compound of the following formula (3), said polyether polyol said organic polyisocyanate compound, and said (meth)acrylate containing a hydroxyl group,

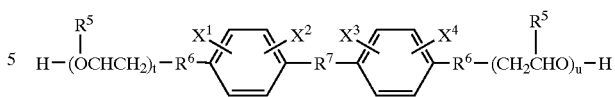

(3)

wherein $R^5$ individually represents a hydrogen atom or a methyl group, $R^6$ individually represents an oxygen atom or sulfur atom, $R^7$ is a group —$CH_2$—, —$C(CH_3)_2$—, —S—, —SO—, or —$SO_2$—, $X^1$ to $X^4$ individually represent a hydrogen atom, methyl group, or bromine atom, and t and u individually represent an integer from 0 to 9.

4. The photocurable resin composition according to claim 1, containing 30–70 wt % of component (A), 20–60 wt % of component (B), 0.5–7 wt % of component (C), and 0.01–5 wt % of component (D).

5. The photocurable resin composition according to claim 1, wherein the cured product made from the photocurable resin composition has a refractive index of 1.53 or more at 25° C.

6. The photocurable resin composition according to claim 1, wherein the cured product made from the photocurable resin composition has a Young's modulus of 0.5–30 kg/mm².

7. A process for making optical parts comprising curing the photocurable resin composition as defined in claim 1.

8. Optical parts comprising a cured product, obtained by curing of the photocurable resin composition as defined in claim 1.

* * * * *